United States Patent
Lee et al.

(10) Patent No.: US 10,454,634 B2
(45) Date of Patent: Oct. 22, 2019

(54) METHOD FOR ALLOCATING RESOURCES FOR SUPPORTING PLURALITY OF WIRELESS COMMUNICATION MODES IN WIRELESS COMMUNICATION SYSTEM, AND DEVICE FOR SAME

(71) Applicant: LG ELECTRONICS INC., Seoul (KR)

(72) Inventors: Sangrim Lee, Seoul (KR); Hyunsoo Ko, Seoul (KR); Kukheon Choi, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 15/559,223

(22) PCT Filed: Oct. 14, 2015

(86) PCT No.: PCT/KR2015/010821
§ 371 (c)(1),
(2) Date: Sep. 18, 2017

(87) PCT Pub. No.: WO2016/148362
PCT Pub. Date: Sep. 22, 2016

(65) Prior Publication Data
US 2018/0083749 A1 Mar. 22, 2018

Related U.S. Application Data

(60) Provisional application No. 62/135,174, filed on Mar. 19, 2015.

(51) Int. Cl.
*H04W 72/04* (2009.01)
*H04L 5/00* (2006.01)
(Continued)

(52) U.S. Cl.
CPC .......... *H04L 5/0035* (2013.01); *H04L 5/0007* (2013.01); *H04L 5/0092* (2013.01);
(Continued)

(58) Field of Classification Search
CPC . H04L 5/0035; H04L 5/0094; H04L 27/2602; H04L 5/12; H04L 5/0092;
(Continued)

(56) References Cited

U.S. PATENT DOCUMENTS 8,929,352 B2 * 1/2015 Fettweis ................ H04L 5/003
370/344
9,692,629 B2 * 6/2017 Yang ..................... H04L 5/0066
(Continued)

FOREIGN PATENT DOCUMENTS

EP 2200244 A1 6/2010
WO WO 2010/117208 A2 10/2010

OTHER PUBLICATIONS

Fettweis et al., "GFDM—Generalized Frequency Division Multiplexing," 2009 IEEE 69th Vehicular Technology Conference, Barcelona, Spain, Apr. 26-29, 2009, pp. 1-4.

*Primary Examiner* — Phuc H Tran
(74) *Attorney, Agent, or Firm* — Birch, Stewart, Kolasch & Birch, LLP

(57) ABSTRACT

A method for a base station to allocate resources for supporting a plurality of wireless communication modes in a wireless system according to the present invention comprises the steps of: allocating, using frequency-division multiplexing, a first zone composed of orthogonal frequency division multiplexing (OFDM) symbols and a second zone composed of generalized frequency division multiplexing (GFDM) symbols on time and frequency domains; and allocating a predetermined number of guard subcarriers to the boundary between the first zone and the second zone, wherein the predetermined number is determined on the basis of the number of sub-symbols of the GFDM symbols of the second zone.

10 Claims, 16 Drawing Sheets

(51) Int. Cl.
*H04L 5/12* (2006.01)
*H04L 27/26* (2006.01)

(52) U.S. Cl.
CPC .............. *H04L 5/0094* (2013.01); *H04L 5/12* (2013.01); *H04L 27/2602* (2013.01); *H04W 72/0446* (2013.01); *H04L 5/0048* (2013.01); *H04L 5/0053* (2013.01)

(58) Field of Classification Search
CPC ... H04L 5/0007; H04L 5/0048; H04L 5/0053; H04W 72/0446
See application file for complete search history.

(56) References Cited

U.S. PATENT DOCUMENTS

| | | | |
|---|---|---|---|
| 2009/0323515 A1 | 12/2009 | Ishikura et al. | |
| 2015/0071242 A1* | 3/2015 | Vilaipornsawai | H04L 25/0224 370/330 |
| 2015/0188654 A1* | 7/2015 | Fettweis | H04L 5/003 370/344 |
| 2017/0264476 A1* | 9/2017 | Yang | H04L 5/0066 |

\* cited by examiner (a) GFDM (b) OFDM (c) OFDM (w/ ¼ symbol duration)

METHOD FOR ALLOCATING RESOURCES FOR SUPPORTING PLURALITY OF WIRELESS COMMUNICATION MODES IN WIRELESS COMMUNICATION SYSTEM, AND DEVICE FOR SAME

CROSS REFERENCE TO RELATED APPLICATIONS

This application is the National Phase of PCT International Application No. PCT/KR2015/010821, filed on Oct. 14, 2015, which claims priority under 35 U.S.C. 119(e) to U.S. Provisional Application No. 62/135,174, filed on Mar. 19, 2015, all of which are hereby expressly incorporated by reference into the present application.

TECHNICAL FIELD

The present invention relates to a wireless communication system, and more particularly, to a method for allocating resources for supporting a plurality of wireless communication modes in a wireless communication system and a device for the same.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms.

However, the frame structure having a TTI of 1 ms according to the related art has a problem in that data request latency of 1 ms cannot be fulfilled. 5G aims to provide data latency reduced as much as about 10 times as compared with the related art. In order to solve the problem, a 5G communication system requires a new TTI structure and new types of symbols. However, the new TTI structure and new types of symbols have not been suggested up to now.

DISCLOSURE

Technical Problem

An object of the present invention is to provide a method for allocating resources for supporting a plurality of wireless communication modes from a base station (BS) in a wireless communication system.

Another object of the present invention is to provide a BS for allocating resources for supporting a plurality of wireless communication modes in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, a method for allocating resources for supporting a plurality of wireless communication modes by a base station (BS) in a wireless system comprises allocating a first zone consisting of orthogonal frequency division multiplexing (OFDM) symbols and a second zone consisting of generalized frequency division multiplexing (GFDM) symbols on time and frequency domains by a frequency division multiplexing scheme; and allocating a predetermined number of guard subcarriers to a boundary between the first zone and the second zone.

The predetermined number may be determined based on a number of sub-symbols of the GFDM symbols of the second zone. The number of sub-symbols of the GFDM symbols may be determined based on a number of resource blocks or subcarriers of the second zone. The number $M_{sub}$ of sub-symbols of the GFDM symbols of the second zone is an integer closest to $$\sqrt{\frac{N_{sc} \times N_{RS}}{N_{sym}}},$$

and corresponds to an aliquot of a number $N_{sc}$ of subcarriers of the second zone, wherein $N_{sym}$ is the number of OFDM symbols which belong to one TTI, and $N_{RS}$ is a number of OFDM symbols allocated as reference signals. The predetermined number may be the number of sub-symbols of the GFDM symbols of the second zone—1. A TTI (Transmission Time Interval) of the first zone may be a subframe consisting of 14 or 12 OFDM symbols, and a TTI of the second zone may be a subframe consisting of 13 OFDM symbols. The BS may allocate a UE, which requires lower latency communication than a UE allocated to the first zone, to the second zone.

To achieve another object of the present invention, a base station (BS) for allocating resources for supporting a plurality of wireless communication modes in a wireless system comprises a processor configured to allocate a first zone consisting of orthogonal frequency division multiplexing (OFDM) symbols and a second zone consisting of generalized frequency division multiplexing (GFDM) symbols on time and frequency domains by a frequency division multiplexing scheme and allocate a predetermined number of guard subcarriers to a boundary between the first zone and the second zone, wherein the predetermined number may be determined based on a number of sub-symbols of the GFDM symbols of the second zone.

The number of sub-symbols of the GFDM symbols may be determined based on a number of resource blocks or subcarriers of the second zone. The number $M_{sub}$ of sub-symbols of the GFDM symbols of the second zone is an integer closest to $$\sqrt{\frac{N_{sc} \times N_{RS}}{N_{sym}}},$$

and corresponds to an aliquot of the number $N_{sc}$ of subcarriers of the second zone, wherein $N_{sym}$ is the number of OFDM symbols which belong to one TTI, and $N_{RS}$ is the number of OFDM symbols allocated as reference signals. The predetermined number may be the number of sub-symbols of the GFDM symbols of the second zone—1. A TTI (Transmission Time Interval) of the first zone may be a subframe consisting of 14 or 12 OFDM symbols, and a TTI of the second zone may be a subframe consisting of 13 OFDM symbols. The processor may allocate a UE, which requires lower latency communication than a UE allocated to the first zone, to the second zone.

Advantageous Effects

The present invention suggests a method for configuring sub-symbols based on a new waveform for a reference signal allocation scheme of a TDM mode when a short TTI is configured for low latency communication, whereby time-frequency resource efficiency may be enhanced. Also, a system according to configuration of sub-symbols based on such a new waveform may be multiplexed with maintaining matching with the legacy OFDM system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
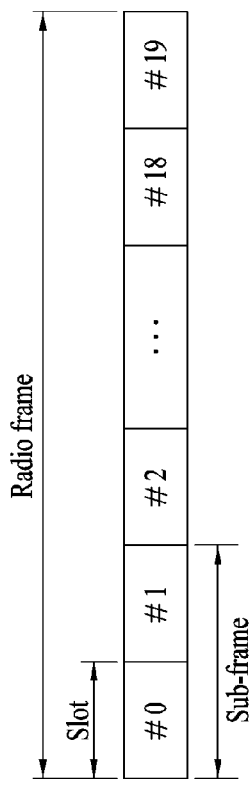
FIG. 1 is a diagram illustrating an FDD frame structure in a 3GPP LTE/LTE-A system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

For wireless transmission between a BS and a UE, transmission from a BS to a UE is expressed as downlink transmission, and transmission from a UE to a BS is expressed as uplink transmission. A mode for identifying radio resources between downlink transmission and uplink transmission will be defined as a duplex mode, and bidirectional transmission and reception through division of a frequency band into a downlink transmission band and an uplink transmission band will be expressed as a frequency division duplex (FDD) mode.

FIG. 1 is a diagram illustrating an FDD frame structure in a 3GPP LTE/LTE-A system.

Referring to FIG. 1, one radio frame is 10 ms (327200× $T_s$) long and divided into 10 equal-sized subframes. Each subframe is 1 ms long and further divided into two slots. Each time slot is 0.5 ms (15360× $T_s$) long. In this case, $T_s$ represents a sampling time and is expressed as $T_s=1/(15 kHz \times 2048)=3.2552 \times 10^{-8}$ (about 33 ns). A slot includes a plurality of Orthogonal Frequency Division Multiplexing (OFDM) symbols or SC-FDMA symbols in the time domain and includes a plurality of Resource Blocks (RBs) in the frequency domain.

Figure 2:
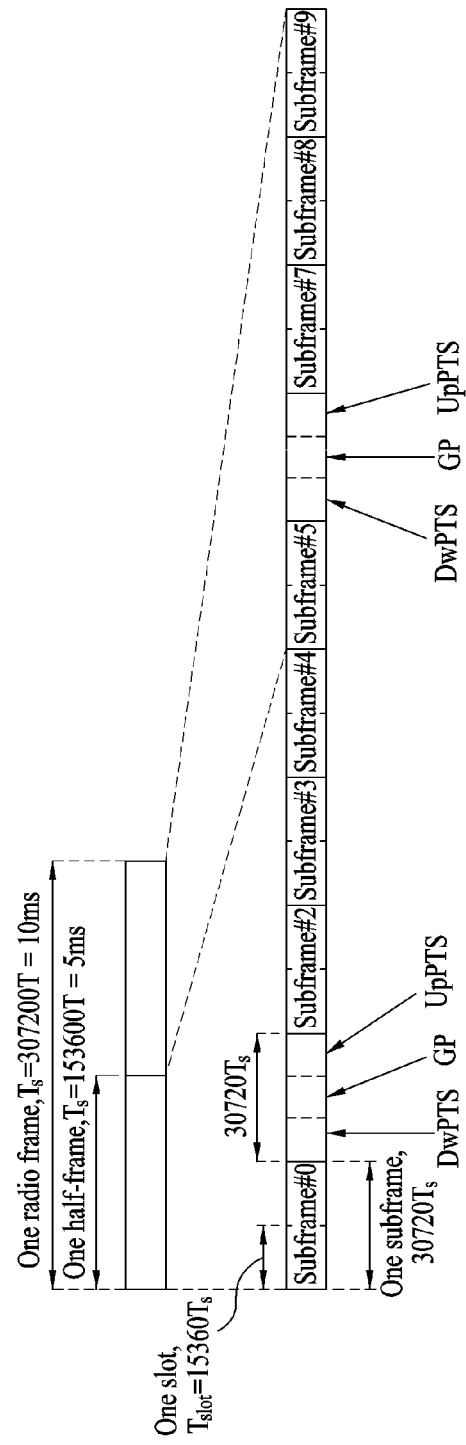
FIG. 2 is a diagram illustrating a TDD frame structure in a 3GPP LTE/LTE-A system.

FIG. 2 is a diagram illustrating a TDD frame structure in a 3GPP LTE/LTE-A system.

Transmission and reception of time domain radio resources in the same frequency band through division of the radio resources into downlink time duration resources and uplink time duration resources will be expressed as a time division duplex (TDD) mode.

Figure 3:
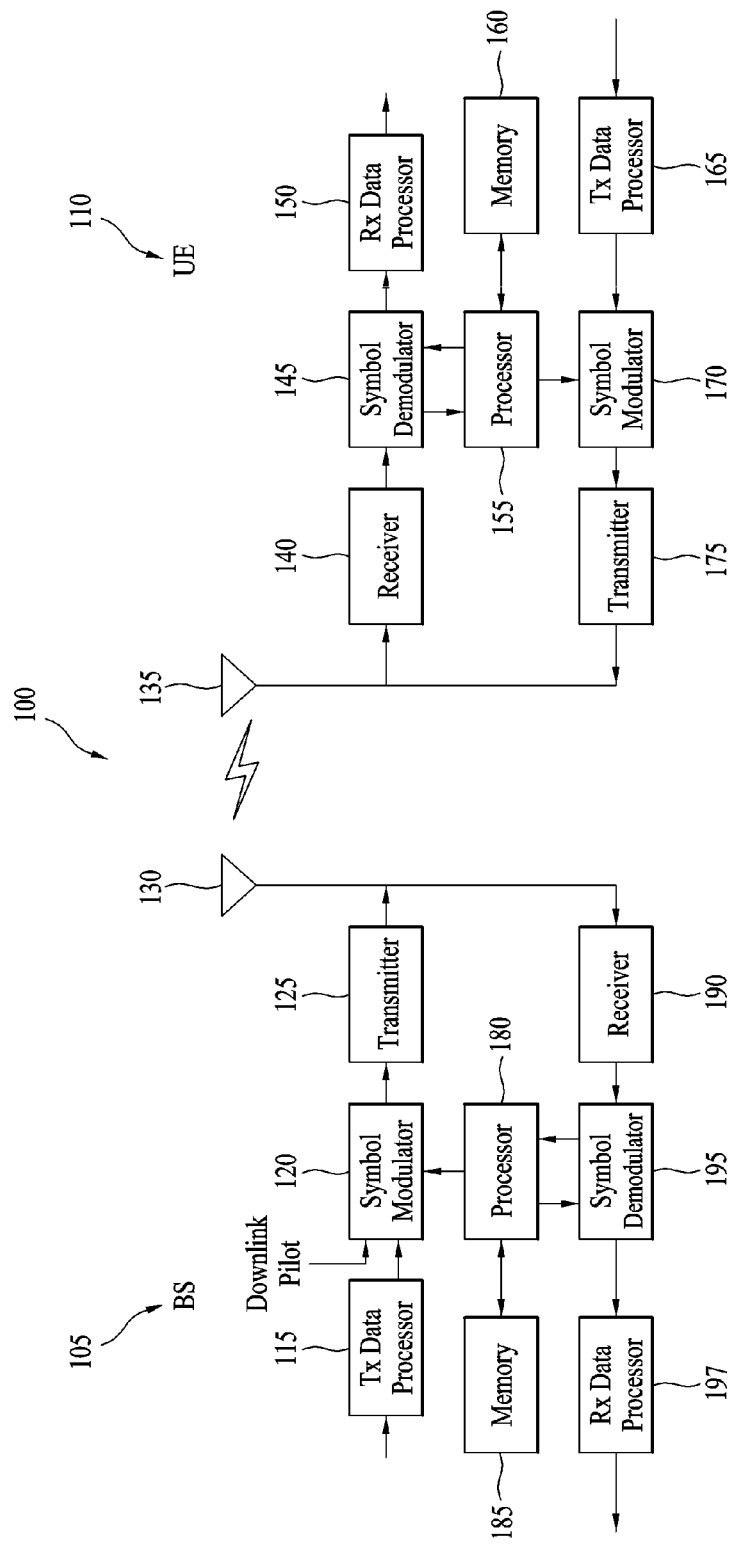
FIG. 3 is a block diagram illustrating a configuration of a BS 105 and a UE 110 in a wireless communication system 100.

FIG. 3 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 3, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 4:
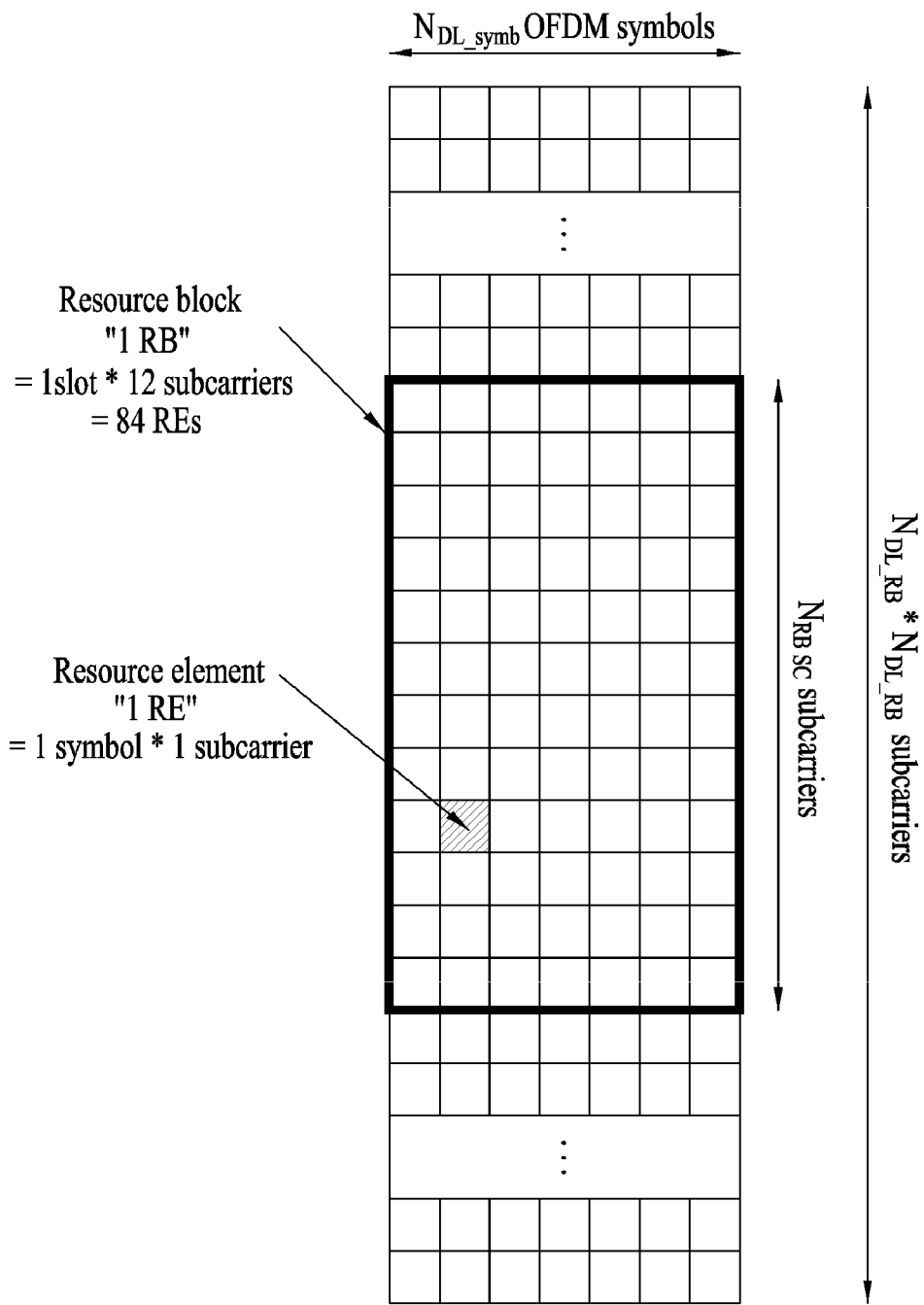
FIG. 4 is a diagram illustrating definition of a general downlink resource in a 3GPP LTE/LTE-A system.

FIG. 4 is a diagram illustrating definition of a general downlink resource in a 3GPP LTE/LTE-A system.

A downlink signal transmitted from each slot is used by a structure of a resource grid that includes $N_{RB}^{DL} \times N_{SC}^{RB}$ subcarriers and $N_{symb}^{DL}$ OFDM (Orthogonal Frequency Division Multiplexing) symbols. In this case, $N_{RB}^{DL}$ denotes the number of resource blocks (RBs) on a downlink, $N_{SC}^{RB}$ denotes the number of subcarriers constituting one RB, and $N_{symb}^{DL}$ denotes the number of OFDM symbols at one downlink slot. A size of $N_{RB}^{DL}$ is varied depending on a downlink transmission bandwidth configured in a cell, and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,RB}$ is the greatest downlink bandwidth supported by the wireless communication system. Although $N_{RB}^{min,DL}=6$ and $N_{RB}^{max,RB}=110$, the present invention is not limited to this case. The number of OFDM symbols included in one slot may be varied depending on a length of cyclic prefix (CP) and an interval of subcarriers. In case of multi-antenna transmission, one resource grid may be defined per antenna port.

Each element within the resource grid for each antenna port is called a resource element (RE), and is uniquely identified by an index pair (k,l) within the slot. In this case, k is an index in the frequency domain and l is an index in the time domain, wherein k has any one of values of 0, ..., $N_{RB}^{DL}N_{SC}^{RB}-1$, and l has any one of values of 0, ..., $N_{symb}^{DL}-1$.

The resource block shown in FIG. 4 is used to describe a mapping relation between a random physical channel and resource elements. The RB may be divided into a physical resource block (PRB) and a virtual resource block (VRB). The one PRB is defined as $N_{symb}^{DL}$ continuous OFDM symbols in the time domain and $N_{SC}^{RB}$ continuous subcarriers in the frequency domain. In this case, $N_{symb}^{DL}$ and $N_{SC}^{RB}$ may be values which are previously determined. For example, $N_{symb}^{DL}$ and $N_{SC}^{RB}$ may be given as listed in Table 1 below. Therefore, one PRB includes $N_{symb}^{DL} \times N_{SC}^{RB}$ resource elements. One PRB may correspond to, but not limited to, one slot in the time domain and correspond to, but not limited to, 180 kHz in the frequency domain.

The 3GPP LTE defines a sub-band as a group of RBs ($N_{RB}^{sb}$), and a size of the sub-band may be obtained through the following Equation. In this case, the number $N_{sb}$ of sub-bands and hopping-mode related parameters are provided by a higher layer. $N_{RB}^{sb}$ may be expressed like the following Equation 1.

$$N_{RB}^{sb} = \begin{cases} N_{RB}^{UL} & N_{sb} = 1 \\ \lfloor (N_{RB}^{UL} - N_{RB}^{HO} - N_{RB}^{HO} \mod 2)/N_{sb} \rfloor & N_{sb} > 1 \end{cases} \quad \text{[Equation 1]}$$

Figure 5:
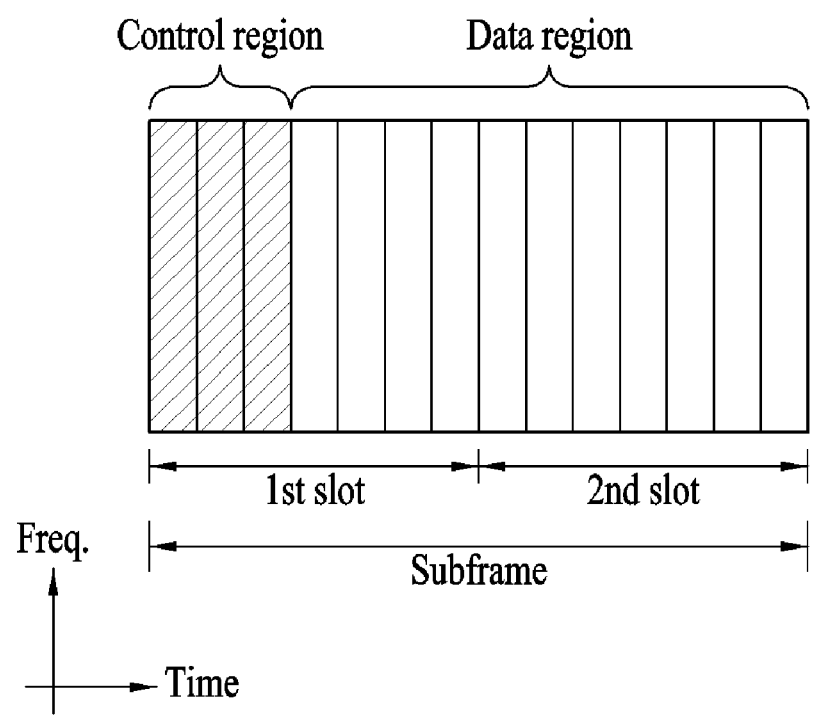
FIG. 5 is a diagram illustrating a structure of a downlink subframe in a 3GPP LTE/LTE-A system.

FIG. 5 illustrates a structure of a downlink subframe of a 3GPP LTE/LTE-A system which is an example of a wireless communication system.

Referring to FIG. 5, one downlink subframe includes two slots in the time domain. Maximum three OFDM symbols at the start of the first slot in a downlink subframe correspond to a control region to which control channels are allocated. The other OFDM symbols correspond to a data region to which a physical downlink shared channel (PDSCH) is allocated.

Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is transmitted from the first OFDM symbol of the subframe, and carries information on the number (that is, size of a control region) of OFDM symbols used for transmission of control channels in the subframe. Control information transmitted through the PDCCH is called Downlink Control Information (DCI). The DCI indicates uplink resource allocation information, downlink resource allocation information and uplink transmission power control command of random UE groups. The PHICH carries an ACKnowledgment/Negative ACKnowledgment (ACK/NACK) signal in response to uplink HARQ. That is, ACK/NACK signal for uplink data transmitted from the UE is transmitted onto the PHICH.

Now, the PDCCH which is a downlink physical channel will be described.

The BS may transmit PDSCH resource allocation and transport format (i.e., DL grant), PUSCH resource allocation information (i.e., UL grant), a set of Tx power control commands for a random UE and individual UEs of a UE group, Voice Over Internet Protocol (VoIP) activity information, etc. A plurality of PDCCHs may be transmitted in the control region. A UE may monitor the plurality of PDCCHs. The PDCCH includes an aggregation of one or more consecutive Control Channel Elements (CCEs). The PDCCH made up of one or more consecutive CCEs may be transmitted through the control region after subblock interleaving. A CCE is a logical allocation unit used to provide a PDCCH with a coding rate based on the state of a radio channel. A CCE corresponds to a plurality of RE Groups (REGs). The format of the PDCCH and the number of available bits for the PDCCH are determined in accordance with the relationship between the number of CCEs and a coding rate provided by the CCEs. Control information transmitted through the PDCCH is called Downlink Control Information (DCI). The following Table 1

In the LTE/LTE-A system, one resource block (RB) includes 12 subcarriers×7(6) OFDM symbols or SC-FDMA (Single Carrier-Frequency Division Multiple Access) symbols. A transmission time interval (TTI) which is a unit time of data transmission may be determined in a unit of one or more subframes. The aforementioned structure of the radio frame is only exemplary, and the number of subframes included in the radio frame, the number of slots included in the subframe, or the number of OFDM symbols or SC-FDMA symbols included in the slot may be varied in various manners.

Figure 6:
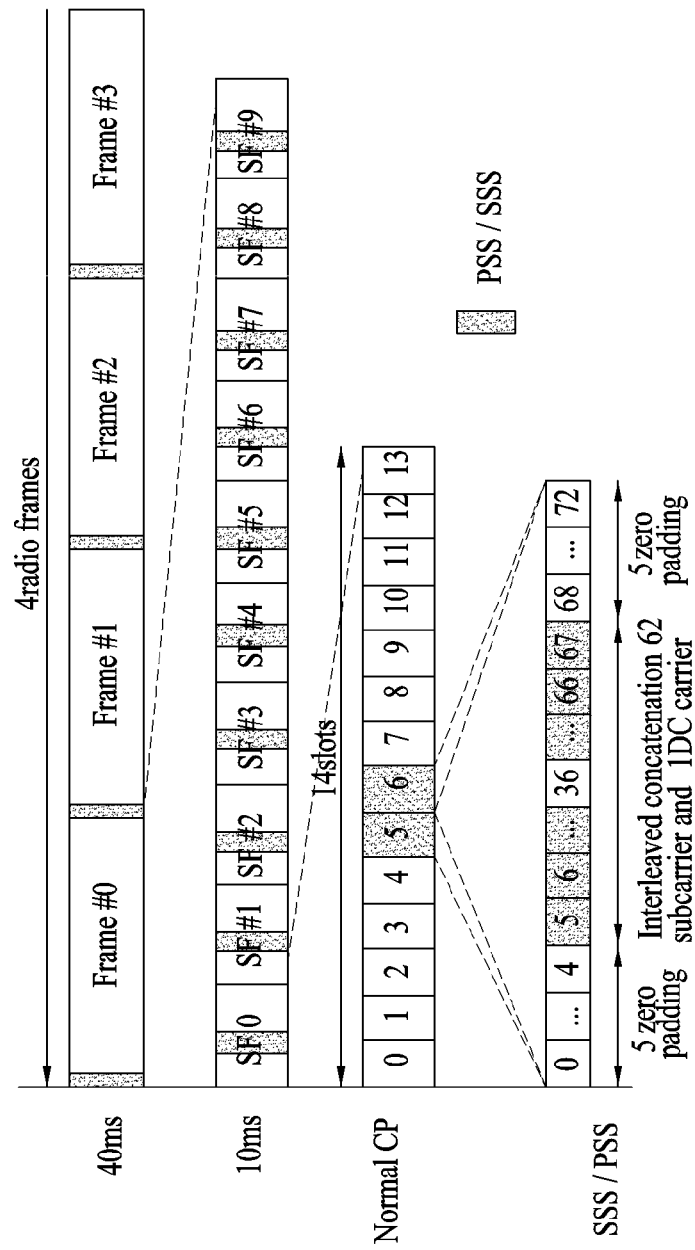
FIG. 6 is a diagram illustrating a structure of PSS/SSS in an FDD frame structure in a 3GPP LTE/LTE-A system.

FIG. 6 is a diagram illustrating a structure of a PSS/SSS in an FDD frame structure of a 3GPP LTE/LTE-A system.

As shown in FIG. 6, the 3GPP LTE/LTE-A system periodically transmits a primary synchronization signal (PSS) and a secondary synchronization signal (SSS) for downlink synchronization. In case of LTE FDD, the same PSS/SSS is repeatedly transmitted twice through the last two symbols of the first slot of subframes (indexes 0 and 5) (6RBs, 72 subcarriers). The PBCH is transmitted through first four OFDM symbols (symbol indexes 0, 1, 2 and 3) of the second slot of the first subframe (subframe of index 0). The PBCH carries system information necessarily required for communication of a wireless device with the BS, and the system information transmitted through the PBCH will be referred to as master information block (MIB). By contrast, system information transmitted onto PDSCH (Physical Downlink Shared Channel) indicated by the PDCCH will be referred to as system information block (SIB).

Figure 7:
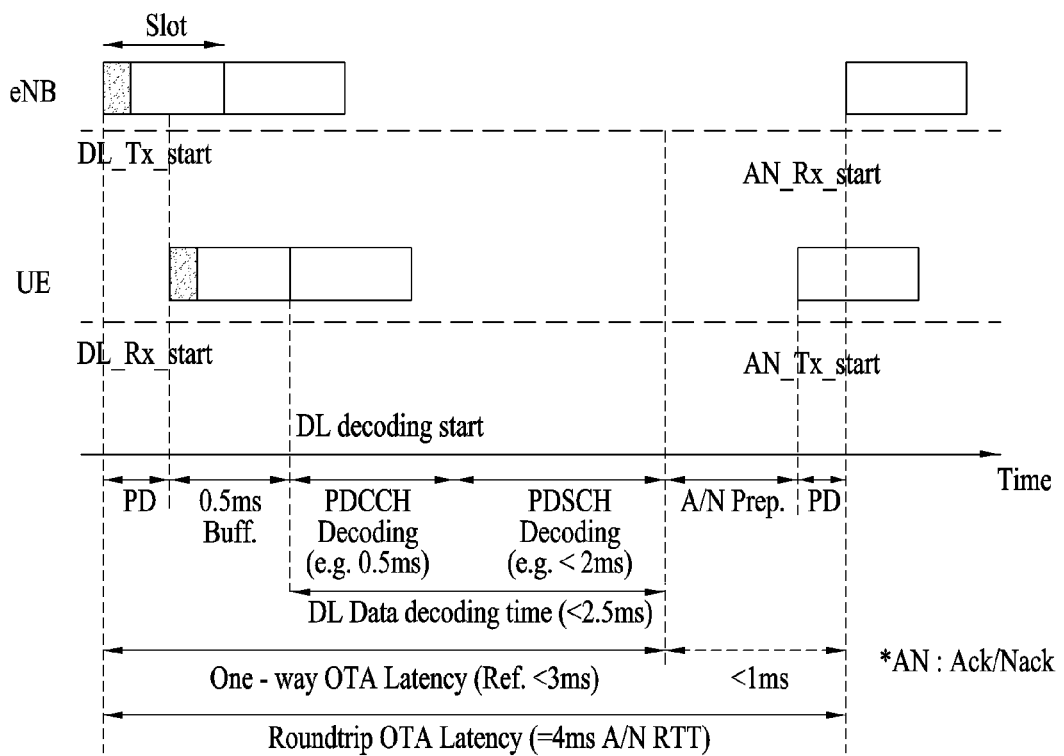
FIG. 7 is an exemplary diagram illustrating LTE Round Trip Time (over the air latency) in a 3GPP LTE system.

FIG. 7 is an exemplary diagram illustrating LTE Round Trip Time (over the air latency) in a 3GPP LTE system.

A reference of wireless transmission and reception latency may be illustrated as shown in FIG. 6 in view of downlink transmission and reception of the 3GPP LTE system having a subframe of 1 ms. As shown in FIG. 6, latency in reaching ACK/NACK reception with respect to unidirectional data transmission is generally 4 ms.

Two Approaches for Short TTI

Two schemes may be considered as methods for reducing wireless transmission and reception latency. There are a method for reducing the number of symbols, which belong to TTI, while maintaining one symbol length, and a method for reducing one symbol length. The first method is to reduce a scheduling unit by configuring a new TTI, which includes small symbols, from TTI (1 ms) of 14 symbols in the legacy LTE system. This has an effect that reduces a time for transmission and reception by reducing TTI. However, since the number of symbols has been reduced, time/frequency resources that may be transmitted for one TTI may be reduced, whereby a problem occurs in that overhead is increased. For example, when a short TTI is configured to include three symbols, an uplink structure is as shown in FIG. 8.

Figure 8:
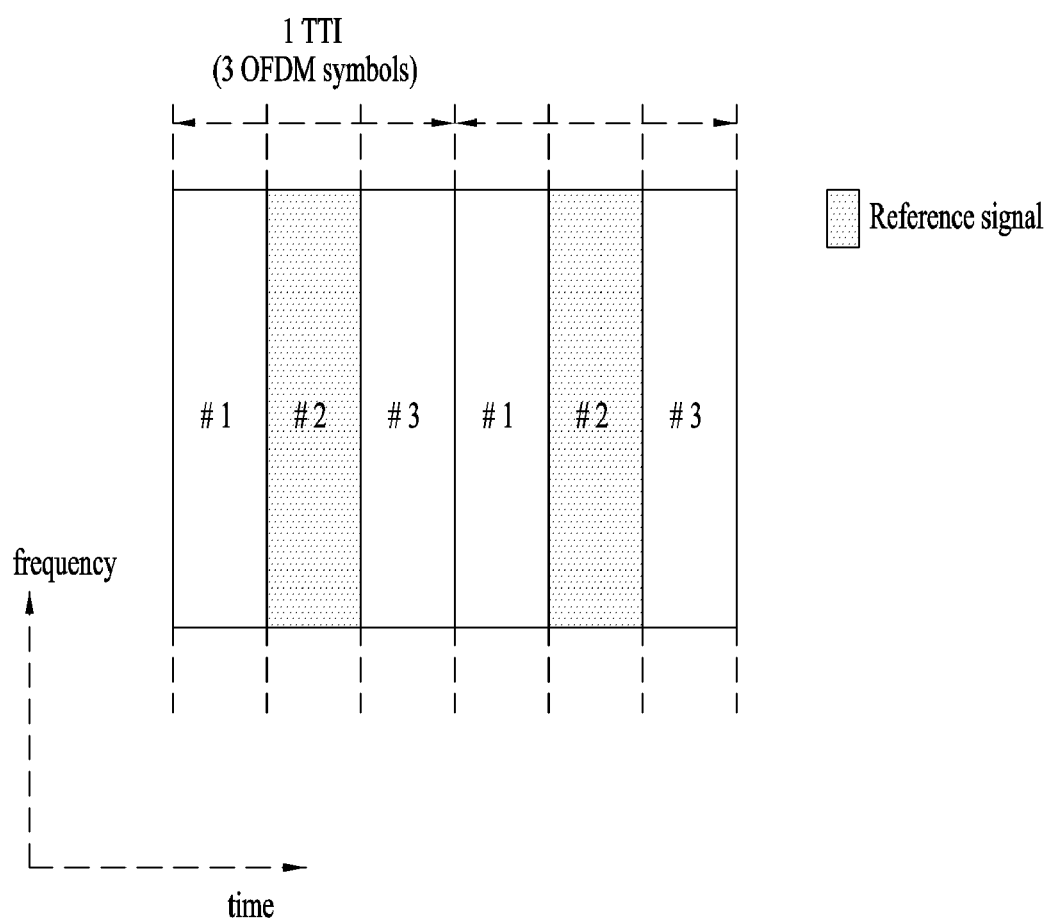
FIG. 8 is a diagram illustrating an uplink structure (for example, LTE Uplink PUSCH (short TTI)) when a short TTI is configured.

FIG. 8 is a diagram illustrating an uplink structure (for example, LTE Uplink PUSCH (short TTI)) when a short TTI is configured.

Referring to FIG. 8, a problem occurs in that efficiency of time and frequency resources is deteriorated more remarkably than the legacy LTE system due to allocation of a reference signal for data detection. For example, when supposing that one user is allocated with 1RB (12 subcarriers), a total of time-frequency resources become 36 (12×3) REs, wherein 12 REs are used as reference signals, whereby overhead of 33% is generated.

As a second method, a length of one OFDM symbol may be reduced. As a symbol length is reduced, more symbols may be included in one TTI than the first method for reducing TTI while maintaining the original length even though a short TTI is configured. According to this method, good effect may be expected in view of reference signal overhead. Although it seems that more time-frequency resources are used due to a shorter symbol length, if the symbol length is reduced, a frequency width of a signal is increased in proportional to the reduced symbol length, whereby the entire time-frequency resources are used equally.

Figure 9:
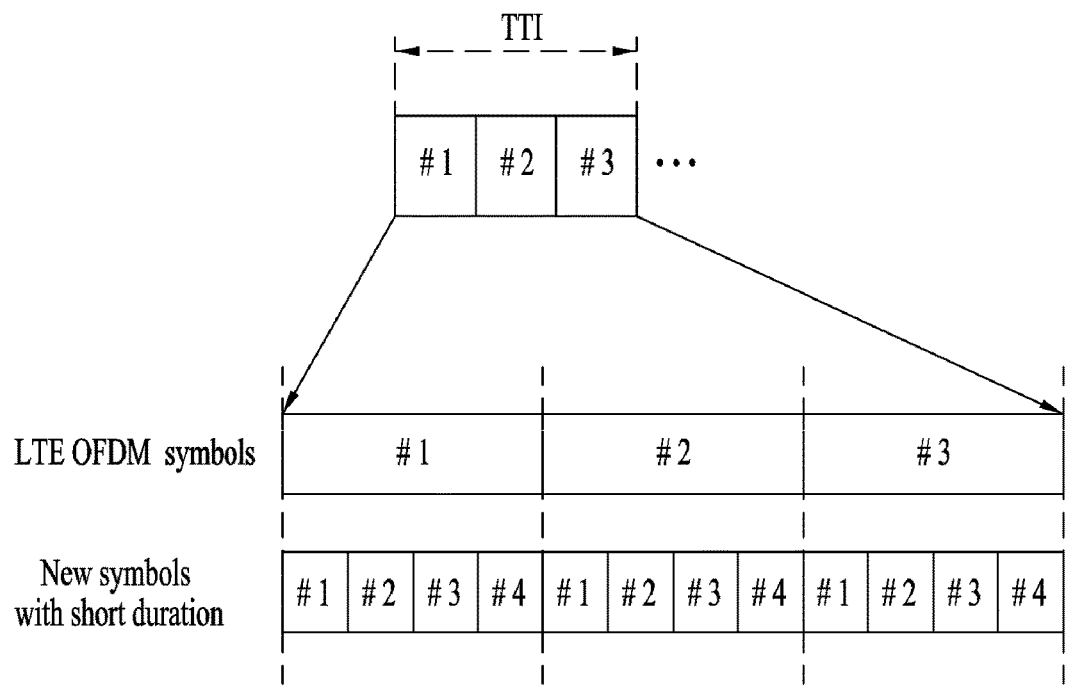
FIG. 9 is a diagram illustrating a comparison between new type symbols having a short duration and legacy LTE OFDM symbols.

FIG. 9 is a diagram illustrating a comparison between new type symbols having a short duration and legacy LTE OFDM symbols.

In FIG. 9, as an example, 1 RB is supposed when the original symbol length is reduced as much as ¼. In this case, the new type symbols and the legacy LTE OFDM symbols have the same 36 time-frequency resources (3 subcarriers× 12 OFDM symbols). When a reference signal is mapped by TDM, one symbols is used as a reference signal, whereby overhead of 9% is generated. In this case, gain is obtained as compared with the first method. However, the number of cyclic prefixes (CPs) that reserve a part of each OFDM symbol length is additionally increased as much as 4 times, whereby CP overhead is increased. Even though these two aspects are all considered, the second method (method for reducing a length of one OFDM symbol) may be more efficient than the first method in view of efficiency of time-frequency resources. It is assumed that a CP length is 4 us and a symbol length is 66 us, overheads of RS and CP in the two methods are 37% and 27%, respectively. Therefore, the second method is more efficient.

However, a new problem occurs in the second method as follows unlike the first method in view of matching with the legacy LTE system.

Figure 10:
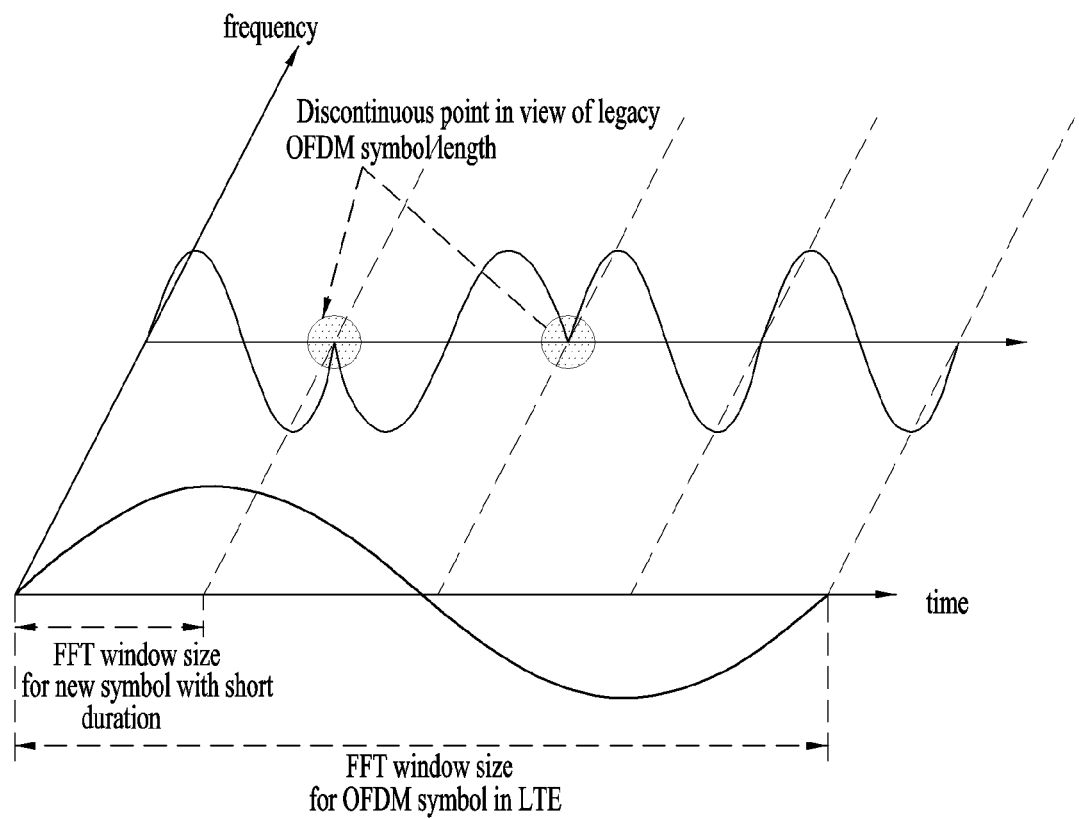
FIG. 10 is an exemplary diagram illustrating a time-frequency waveform between OFDM symbols and new type symbols having a short symbol length.

FIG. 10 is an exemplary diagram illustrating a time-frequency waveform between OFDM symbols and new type symbols having a short symbol length.

Basically, for orthogonality of OFDM symbols, the OFDM symbols should be matched with an integer multiple of a sine waveform period within a fast fourier transform (FFT) window size, whereby orthogonality between subcarriers is maintained. However, if the OFDM symbols and the new type symbols have their respective symbol lengths different from each other as shown in FIG. 10, the integer multiple of the period within each FFT window size is not ensured for the two symbols, whereby interference between subcarriers occurs necessarily and thus causes throughput degradation.

In short, it is noted that the first method is advantageous in view of matching with the legacy OFDM symbols when a short TTI is configured, whereas the second method is more advantageous than the first method in view of efficiency of the time-frequency resources. The method for reducing a symbol length lowers matching with the legacy OFDM symbols. As described above, the two methods for configuring a short TTI have their respective advantages and problems, the present invention is intended to suggest new type symbols or new type waveform.

To this end, new type symbols called Generalized Frequency Division Multiplexing (GFDM) symbols are used. In the waveform of GFDM symbols, the time-frequency resources may be more flexibly configured based on a concept of sub-symbol, and symbols of a new block-based structure, which introduces pulse shaping and tail-biting techniques using symbol overlap between sub-symbols, may be designed.

Figure 11:
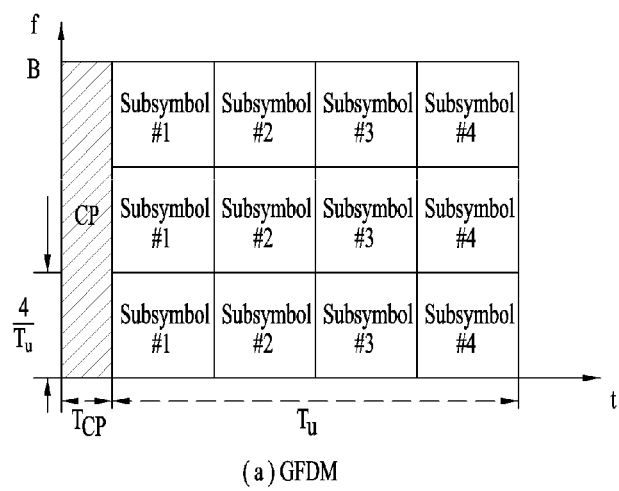
FIG. 11 is a diagram illustrating a resource grid for comparison among GFDM symbols, legacy OFDM symbols and OFDM symbols of a short symbol length.
Figure 11:
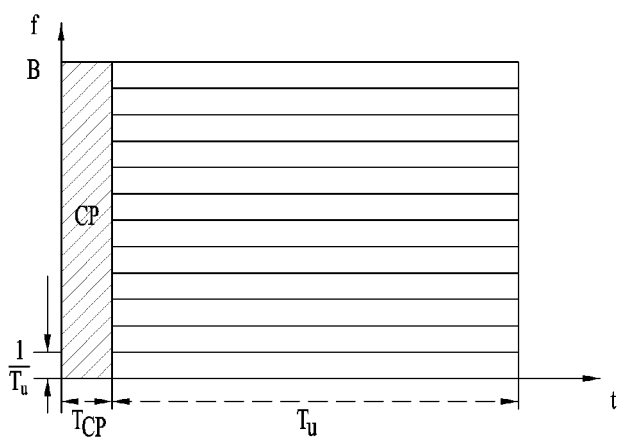
Figure 11:
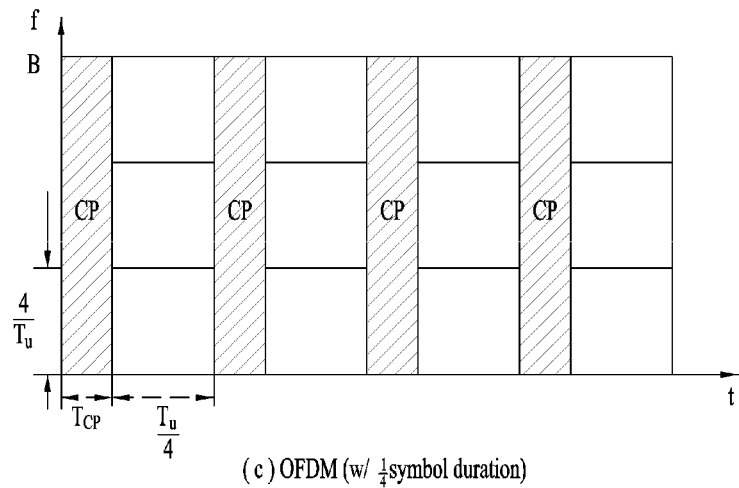

FIG. 11 is a diagram illustrating a resource grid for comparison among GFDM symbols, legacy OFDM symbols and OFDM symbols of a short symbol length.

FIG. 11 illustrates a total of 12 time-frequency resources in the LTE/LTE-A system. FIG. 11(a) illustrates GFDM symbols comprised of 4 sub-symbols, FIG. 11(b) illustrates the legacy OFDM symbols, and FIG. 11(c) illustrates that a length of the legacy OFDM symbol is reduced to ¼. The GFDM symbols shown in FIG. 11(a) are similar to the symbols shown in FIG. 11(c), which have a symbol length of ¼ of the legacy OFDM symbol, but their CP configuration is different from that of the symbols shown in FIG. 11(c).

Figure 12:
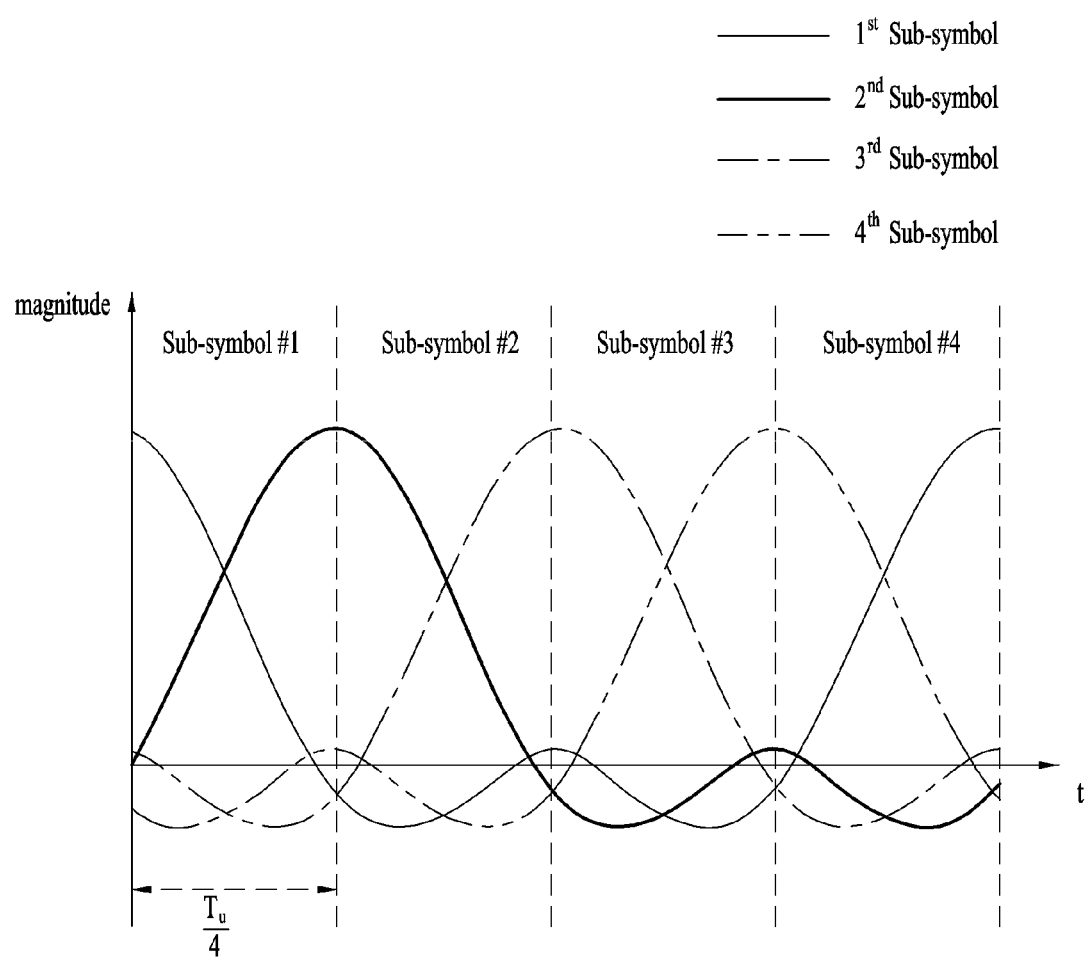
FIG. 12 is a diagram illustrating a pulse shape (raised cosine filter with roll-off=0.25) per sub-symbol of GFDM.

FIG. 12 is a diagram illustrating a pulse shape (raised cosine filter with roll-off=0.25) per sub-symbol of GFDM.

Another pulse shape not the original rectangular shape is applied through a signal pulse which forms overlap between sub-symbols, whereby a leakage power of subcarrier, which affects another subcarrier, may be reduced as compared with the legacy symbol structure. In this way, GFDM newly suggested in the present invention may be used to newly approach the aforementioned problem. A GFDM symbol length may be maintained equally to the legacy OFDM symbol based on the structure of GFDM in a short TTI status, whereby matching may be obtained, and overhead of time-frequency resources may be reduced through sub-symbols.

In more detail, CP overhead may be maintained equally to that of the legacy OFDM and at the same time overhead of the reference signal may be reduced and matching with the legacy system may be maintained. The new waveform called GFDM may be used for configuration of short TTI as described above. However, to acquire the advantage of the GFDM symbols, it is required to solve a problem that orthogonality is lost due to a difference in a sub-symbol length between the legacy OFDM symbols and the GFDM symbols. As compared with the method based on the OFDM symbols of which length causing interference is short, the legacy OFDM symbols do not affect the GFDM symbols but the GFDM symbols affect the legacy OFDM symbols.

The present invention suggests a time-frequency resource structure based on a new waveform suitable for TTI of a short length for low latency communication and a method for multiplexing OFDM and GFDM. In more detail, to multiplex GFDM and OFDM while maintaining orthogonality of GFDM and OFDM, guard subcarriers are required. The present invention suggests a method for determining the number of sub-symbols of GFDM having minimum overhead based on the guard subcarriers.

Figure 13:
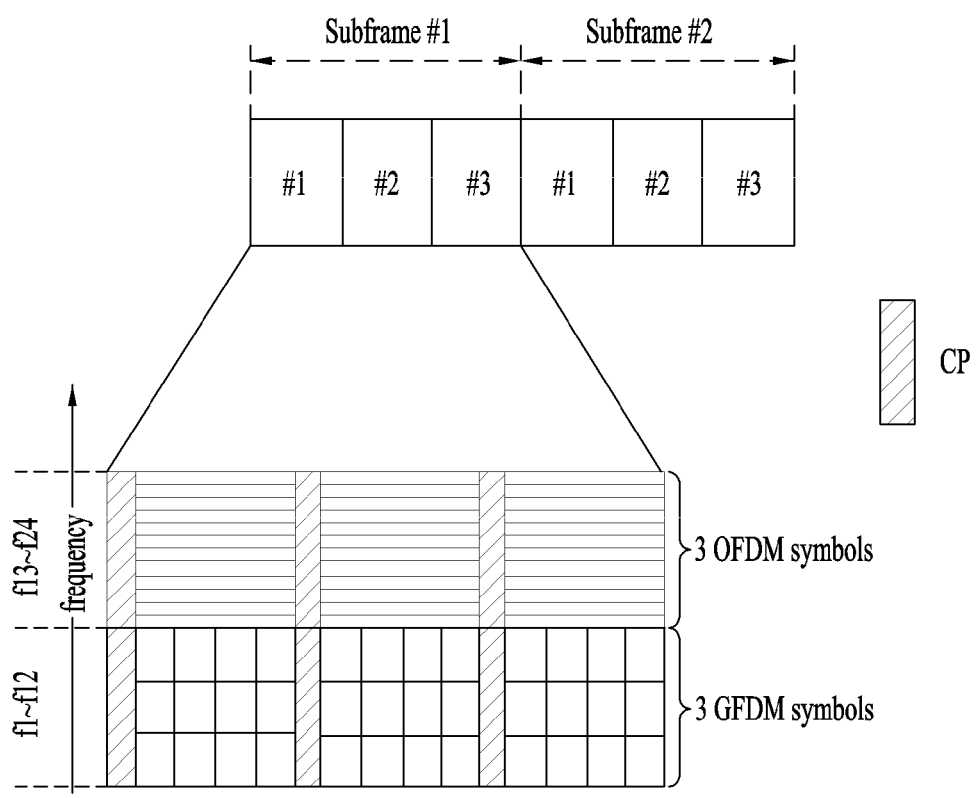
FIG. 13 is an exemplary diagram for multiplexing of GFDM and OFDM.

First of all, it is assumed that the legacy LTE OFDM symbols and new GFDM symbols are configured in the time-frequency resources as shown in FIG. 13.

FIG. 13 is an exemplary diagram for multiplexing of GFDM and OFDM.

In FIG. 13, one TTI (subframe) includes three OFDM symbols. FIG. 13 illustrates a time-frequency resource grid where GFDM symbols having 4 sub-symbols and legacy OFDM symbols are arranged at their adjacent frequency. In this case, a pulse shape (GFDM is a raised cosine filter with roll-off factor=0.25) in the frequency domain is as shown in FIG. 14.

Figure 14:
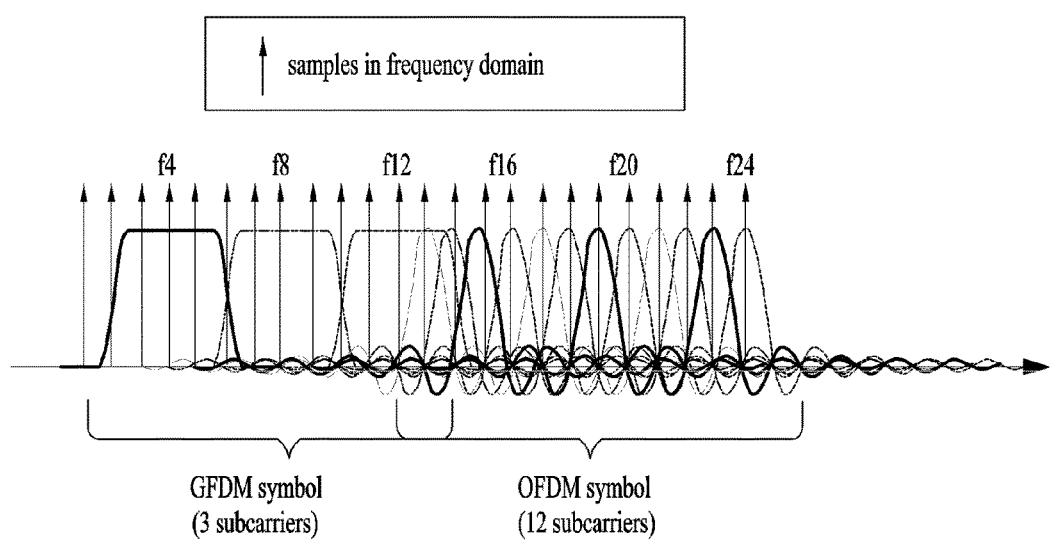
FIG. 14 is a diagram illustrating a waveform when GFDM symbols having 4 sub-symbols and legacy OFDM symbols are arranged at their adjacent frequency for their multiplexing as shown in FIG. 13.

FIG. 14 is a diagram illustrating a waveform when GFDM symbols having 4 sub-symbols and legacy OFDM symbols are arranged at their adjacent frequency for their multiplexing as shown in FIG. 13.

As shown in FIG. 14, according to samples in the frequency domain (f1, f2, . . . , f24 in a frequency axis direction), interference among neighboring subcarriers f13, f14 and f15 occurs, and is determined depending on the number of sub-symbols. Therefore, it is intended to suggest a structure for efficiently using time-frequency resources. First of all, the following are defined.

$N_{sc}$: The number of total subcarriers
$N_{sym}$: The number of symbols which belong to one TTI
$T_{sym}$: Length (sec) of one symbol
$T_{CP}$: Length of CP
$N_{RS}$: The number of symbols allocated as reference signals
$M_{sub}$: The number of sub-symbols of GFDM symbols (this should be an aliquot of $N_{sc}$)
$N_{guard}$: The number of guard subcarriers between GFDM symbols and OFDM symbols (number of $M_{sub}-1$ or less)

Efficiency of frequency resources of the legacy OFDM symbols is defined as expressed by the following Equation 2, and efficiency of frequency resources of the GFDM symbols is defined as expressed by the following Equation 3.

$$\text{Overhead}_{OFDM} = (N_{sc} \times N_{RS} + T_{CP}/T_{sym} \times N_{sym})/(N_{sc} \times N_{sym}) \quad \text{[Equation 2]}$$

$$\text{Overhead}_{GFDM} = (N_{sc}/M_{sub} \times N_{RS} + N_{guard} \times N_{sym} + T_{CP}/T_{sym} \times N_{sym})/(N_{sc} \times N_{sym}) \quad \text{[Equation 3]}$$

Therefore, it is noted that gain is obtained in resource efficiency during configuration of GFDM symbols when a reference of the following Equation 4 is satisfied from the Equations 2 and 3.

$$N_{sc} \times N_{RS} - N_{sc}/M_{sub} \times N_{RS} - N_{guard} \times N_{sym} > 0 \quad \text{[Equation 4]}$$

In this case, the number ($N_{guard}$) of guard subcarriers should be determined depending on a value of $M_{sub}$ (the number of sub-symbols of GFDM symbols) for orthogonality of OFDM symbols and GFDM symbols. Therefore, a solution is changed depending on how a function is configured depending on $M_{sub}$ of $N_{guard}$.

Embodiment 1: Case that the Number of Guard Subcarriers is Set to the Number of Sub-Symbols of GFDM Symbols −1 ($N_{guard}=M_{sub}-1$)

First of all, to multiplex OFDM symbols and GFDM symbols, the OFDM symbols and the GFDM symbols should maintain orthogonality with each other. If a raised cosine filter roll-off factor is set to 1, guard subcarriers should be given as much as the number of maximum $M_{sub}-1$. For this orthogonality, the case that $N_{guard}$ is set to $M_{sub}-1$ may be considered, and this case corresponds to the case that the most guard subcarriers are given. In this case, the Equation 4 may be expressed by the following Equation 5.

$$N_{sc} \times N_{RS} - N_{sc}/M_{sub} \times N_{RS} - (M_{sub}-1) \times N_{sym} > 0 \quad \text{[Equation 5]}$$

By the Equation 5, the number of sub-symbols of GFDM symbols is determined as expressed by the following Equation 6.

$$1 < M_{sub} < (N_{sc} \times N_{RS})/N_{sym} \text{ and aliquot of } M_{sub} = N_{sc} \quad \text{[Equation 6]}$$

To obtain a maximum value, the following Equation 7 that a differential value of the Equation 5 is 0 is obtained as follows.

$$(Nsc \times NRS)/M_{sub}^2 - M_{sub} \times N_{sym} = 0 \quad \text{[Equation 7]}$$

From the above Equation 7, the number $M_{sub}$ of sub-symbols for minimizing overhead is as expressed by the following Equation 8.

$$M_{sub} = \sqrt{\frac{N_{sc} \times N_{RS}}{N_{sym}}}, \quad \text{[Equation 8]}$$

where the number of sub-symbols for minimizing overhead is an integer closest to $$\sqrt{\frac{N_{sc} \times N_{RS}}{N_{sym}}},$$

having an aliquot of $N_{sc}$.

For example, it is assumed that $N_{sc}=80$, $N_{sym}=3$, $N_{RS}=1$, and $T_{CP}/T_{sym}=0.05$. In this case, the number of sub-symbols available from the Equation 6 is configured as 2, 4, 5, 8, 10, 16, or 20. The number of sub-symbols having maximum time-frequency efficiency from the Equation 8 is 5. Time-frequency resource efficiency according to the number of sub-symbols having maximum time-frequency efficiency is as listed in Table 1 below. At this time, overhead of OFDM mode according to the Equation 3 is 0.3340.

TABLE 1

| | $M_{sub}$ | | | | | | |
|---|---|---|---|---|---|---|---|
| | 2 | 4 | 5 | 8 | 10 | 16 | 20 |
| Overhead Equation (2) | 0.1799 | 0.1215 | 0.1174 (minimum value) | 0.1299 | 0.1465 | 0.209 | 0.2549 |

Also, when supposing that there is a sub-symbol $M_{sub1}$ that satisfies the above Equation 5, it is noted that $M_{sub2}$ that satisfies the following Equation 9 also has the same overhead value.

$$M_{sub2} = (N_{sc} \times N_{RS})/(N_{sym} \times M_{sub1}), \text{ and } M_{sub2} \text{ is an aliquot of } N_{sc} \quad \text{[Equation 9]}$$

In case of the number $M_{sub2}$ of sub-symbols, which satisfies the Equation 9, this value is equal to a left value of the Equation 5, that is, has the same overhead value as that of the Equation 5. In next case, the number of sub-symbols having the maximum value is 2.

When the value obtained from the Equation 8 is $M_{sub1}$, and when $M_{sub2}$ that satisfies the Equation 9 exists, both of two values, $M_{sub1}$ and $M_{sub2}$ become the maximum values.

As another example, it is assumed that $N_{sc}=72$, $N_{sym}=3$, $N_{RS}=1$, and $T_{CP}/T_{sym}=0.05$. In this case, the number of sub-symbols available from the Equation 6 is configured as 2, 3, 4, 6, 8, 9, 12, or 18. The number of sub-symbols having maximum time-frequency efficiency from the Equations 8 and 9 is 4 and 6. Time-frequency resource efficiency according to the number of sub-symbols having maximum time-frequency efficiency is as listed in Table 2 below. At this time, overhead of OFDM mode according to the Equation 3 is 0.3340.

TABLE 2

| | $M_{sub}$ | | | | | | | | |
|---|---|---|---|---|---|---|---|---|---|
| | 2 | 3 | 4 | 6 | 8 | 9 | 12 | 18 | 24 | 36 |
| Overhead Equation (2) | 0.1813 | 0.1397 | 0.1258 (minimum value) | 0.1258 (minimum value) | 0.1397 | 0.1489 | 0.1813 | 0.2554 | 0.3341 | 0.4962 |

Embodiment 2: Case that $N_{guard}$ Includes a Function Related to $M_{sub}$ ($N_{guard}=f(M_{sub})$)

Generally, in case of GFDM, a pulse shape may be controlled depending on filter application as shown in FIG. 14. Therefore, for orthogonality, $N_{guard}$ may be set to be shorter than $M_{sub}-1$. Therefore, the above Equation 4 for determining the number of sub-symbols of GFDM symbols may be corrected as expressed by the following Equation 10, and the number of sub-symbols of GFDM symbols may be determined in accordance with the Equation 10.

$$N_{sc} \times N_{RS} - N_{sc}/M_{sub} \times N_{RS} - f(M_{sub}) \times N_{sym} > 0 \quad \text{[Equation 10]}$$

The number of sub-symbols of GFDM symbols is a value of $M_{sub}$ that satisfies the above Equation 10.

It is considered that a raised cosine filter (roll-off factor=$\beta$) is used in a pulse shape of GFDM as shown in FIG. 14. In this case, for orthogonality, the value of $N_{guard}$ may be set to be shorter than $M_{sub}-1$. That is, repetition of the frequency domain with OFDM symbols equivalent to $M/2(1+\beta)$ is generated. Therefore, guard subcarriers equivalent to $$f(M_{sub}) = \left\lceil \frac{M}{2}(1+\beta) \right\rceil - 1$$

may be configured to maintain orthogonality. In this case, $\lceil x \rceil$ means a carry of X.

As an example of the Embodiment 2, it is assumed that $N_{sc}=72$, $N_{sym}=3$, $N_{RS}=1$, $T_{CP}/T_{sym}=0.05$, and $\beta=0.25$. In this case, the number of sub-symbols available from the Equation 10 is 2, 3, 4, 6, 8, 9, 12, 18, or 24. The number of sub-symbols having maximum time-frequency efficiency is 6 or 8. Time-frequency resource efficiency according to the number of sub-symbols having maximum time-frequency efficiency is as listed in Table 3 below, and overhead of OFDM mode according to the Equation 3 is 0.3341.

TABLE 3

| | $M_{sub}$ | | | | | | | |
|---|---|---|---|---|---|---|---|---|
| 2 | 3 | 4 | 6 | 8 | 9 | 12 | 18 | 24 |
| Overhead (Equation 3) 0.1813 | 0.1258 | 0.1119 | 0.098 | 0.098 | 0.1073 | 0.1258 | 0.1721 | 0.2091 |

Also, the present invention considers a system that configures a short TTI (transmit time interval) for supporting a short response time on the basis of a method for allocating a reference signal in a TDM mode. For multiplexing with the legacy system and resource efficiency, the present invention suggests a new time interval resource structure based on a new waveform. This suggested structure suggests embodiments of time-frequency resource structure configuration when a short TTI is configured.

Case of PUSCH (Physical Uplink Shared CHannel) and PUCCH (Physical Uplink Control CHannel) in the 3GPP LTE/LTE-A system In case of PUSCH in the 3GPP LTE/LTE-A system, a center one of 7 symbols is allocated as a reference signal in case of normal CP on the basis of one slot. Reference signal overhead in the LTE system corresponds to 1/7. However, when TTI is configured to include three symbols for low latency communication, reference signal overhead is increased to 1/3. To solve this, if the suggested method is used, overhead of the reference signal may be reduced.

Figure 15:
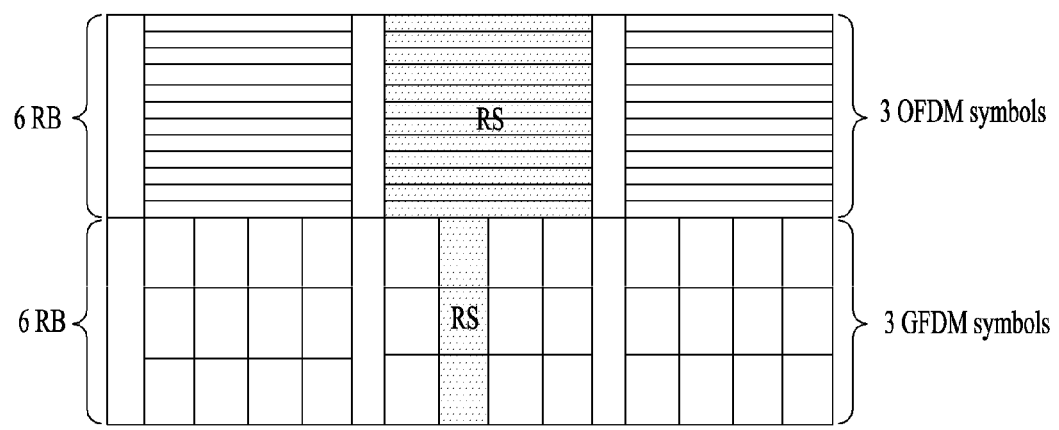
FIG. 15 is a diagram illustrating multiplexing of OFDM symbols and GFDM symbols to reduce overhead of a reference signal according to the present invention.

FIG. 15 is a diagram illustrating multiplexing of OFDM symbols and GFDM symbols to reduce overhead of a reference signal according to the present invention.

As shown in FIG. 15, TTI includes three symbols, and the OFDM symbols and the GFDM symbols are respectively allocated to 6 RBs (72 subcarriers) on a frequency domain. If the legacy OFDM symbols are only configured for 6 RBs (72 subcarriers), reference signal overhead is 33%. As shown in FIG. 15, if the legacy OFDM symbols are only configured for 6 RBs (72 subcarriers), one OFDM symbol is a reference signal transmission band, whereby reference signal overhead is 33%. However, if GFDM symbols suggested in the present invention are configured for 6 RBs (72 subcarriers), reference signal overhead is 12% (Embodiment 1) or 9% (Embodiment 2), whereby reference signal overhead may be reduced significantly.

As described above, real-time game, immersive communication, remote medical care, remote control, etc. have been raised as 5G mobile communication services. To actively support these services, end-to-end latency of data packets should be several ms. End-to-end latency of data packets of the current LTE system is in the range of 20 ms and has limitation in actively supporting the above services. End-to-end latency of data packets may be categorized into a communication interval between a BS and a UE and a core network (CN) interval. The communication interval between the BS and the UE may again be categorized into a wireless access interval and a wireless transmission interval. A scheduling request, resource allocation, etc. correspond to the wireless access interval, and data transmission, data demodulation, etc. correspond to the wireless transmission interval. To reduce end-to-end latency of data packets in the wireless transmission interval, a TTI (Transmission Time Interval) should basically be reduced. A new TTI structure and GFDM symbol configuration have been suggested to provide low latency and high reliable service, and the BS may allocate a new short TTI structure to the UE.

Figure 16:
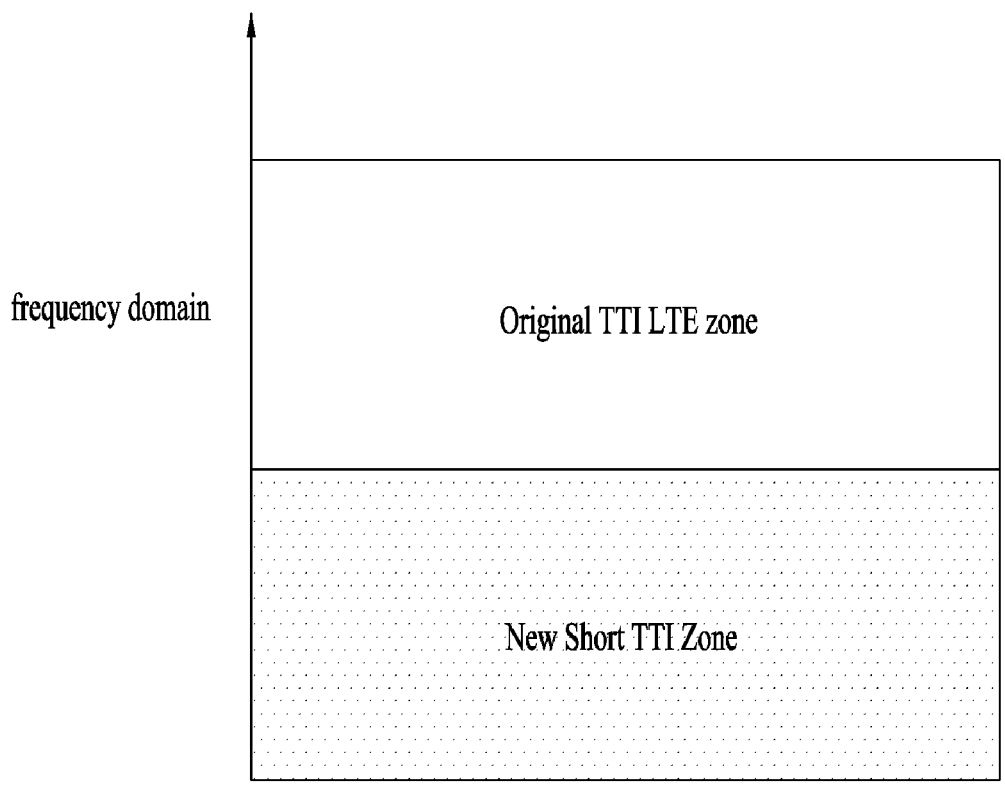
FIG. 16 is an exemplary diagram illustrating a case that a BS allocates a dedicated zone for a short TTI for an uplink.

FIG. 16 is an exemplary diagram illustrating a case that a BS allocates a dedicated zone for a short TTI for an uplink.

As shown in FIG. 16, the BS may allocate the original LTE TTI zone and a new short TTI zone through frequency division multiplexing. In this case, the original LTE TTI zone is the zone allocated for UEs which use the legacy LTE/LTE-A system, and the new short TTI zone is the zone allocated for UEs that require communication such as low latency and high reliability. At this time, guard subcarriers may exist at a boundary between the original LTE TTI zone and the new short TTI zone. In this case, a size of the guard subcarrier is determined based on the number of sub-symbols of GFDM symbols in the new short TTI zone as described in the Embodiment 1 or the Embodiment 2. When the short TTI (three OFDM symbols) is applied to a bandwidth (BW) of 10 MHz (50 RBs), the optimal number of sub-symbols according to the Embodiment 1 may be configured as listed in Table 4 below.

TABLE 4

| The number of RBs which are allocated | 1 | 5 | 10 | 20 |
|---|---|---|---|---|
| The number of possible sub-symbols | 2, 3 | 2, 3, 4, 6, 8, 9, 12, 18 | 2, 3, 4, 5, 6, 8, 10, 12, 15, 20, 24, 30 | 2, 3, 4, 5, 6, 8, 10, 12, 15, 16, 20, 24, 20, 40, 48, 60 |
| The number of sub-symbols for minimum overhead | 2 | 4 or 6 | 6 | 8 or 10 |

The BS may allocate a predetermined number of RBs for a UE which requires low latency communication by multiplexing the new short TTI zone with the original LTE TTI zone on a frequency axis. As an example, the new short TTI zone is adjacent to the original LTE TTI zone on the frequency axis. In this case, guard subcarriers are required at the boundary between the new short TTI zone and the original LTE TTI zone, and their size (or the number of guard subcarriers) may be noted from the number(s) of sub-symbols corresponding to a size of the number of corresponding RBs of the new short TTI zone allocated using the above Table 4 as an example. In this case, the number of sub-symbols having minimum overhead may be noted. In the same manner as the Embodiment 1, the number of sub-symbols having minimum overhead −1 may be determined as the number of guard subcarriers, and the BS may allocate a guard bandwidth equivalent to the number of guard subcarriers to the boundary between the new short TTI zone and the original LTE TTI zone.

Figure 17:
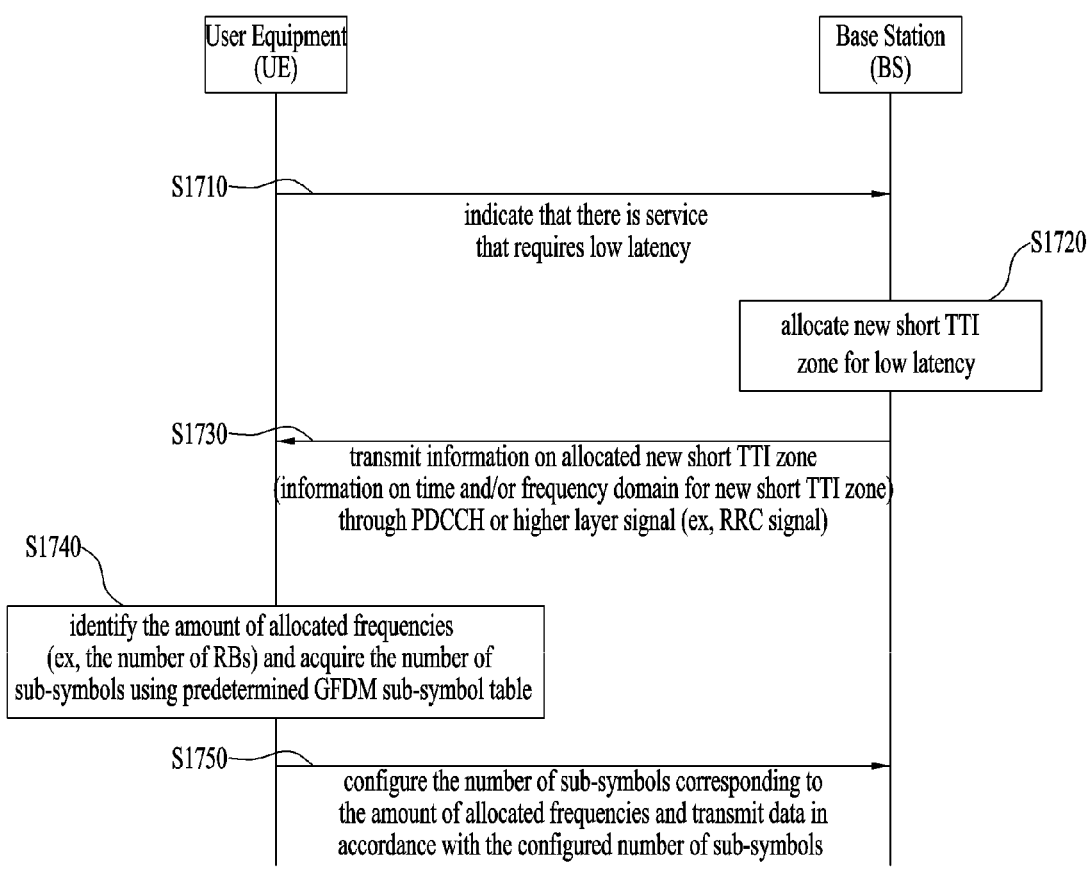
FIG. 17 is an exemplary diagram illustrating a signaling procedure for providing a low latency (or low latency and high reliability) service between a BS and a UE.

FIG. 17 is an exemplary diagram illustrating a signaling procedure for providing a low latency (or low latency and high reliability) service between a BS and a UE.

Referring to FIG. 17, the UE may transmit an indicator, which indicates a service that requires low latency, to the BS (S1710). Then, the BS may allocate a new TTI zone for the low latency service for the UE in accordance with the indicator (S1720), and may transmit information on time and frequency domains for the new TTI zone allocated through a physical layer signal (e.g., PDCCH) or higher layer signal (e.g., RRC (Radio Resource Control) signal) to the UE (S1730). Afterwards, the UE may identify the amount of frequencies allocated for the frequency domain and note the number of sub-symbols corresponding to the amount of frequencies (e.g., the number of RBs (or the number of PRBs or VRBs)) which are allocated, on the basis of the above Table 4 which is predefined (S1740). Afterwards, the UE may configure the number of sub-symbols corresponding to the amount of frequencies which are allocated and transmit data to the BS (S1750).

As described above, the present invention has suggested a method for configuring sub-symbols based on a new waveform to enhance time-frequency resource efficiency for a reference signal allocation scheme of a TDM mode when a short TTI for low latency communication is configured. Also, the present invention has suggested a structure that may be multiplexed with the legacy OFDM system.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for allocating resources for supporting a plurality of wireless communication modes in a wireless communication system and the device for the same are industrially applicable to various wireless communication systems.

The invention claimed is:

1. A method for allocating resources for supporting a plurality of wireless communication modes by a base station (BS) in a wireless system, the method comprising:

allocating a first zone consisting of orthogonal frequency division multiplexing (OFDM) symbols and a second zone consisting of generalized frequency division multiplexing (GFDM) symbols on time and frequency domains by a frequency division multiplexing scheme; and allocating a predetermined number of guard subcarriers to a boundary between the first zone and the second zone, wherein the predetermined number is determined based on a number of sub-symbols of the GFDM symbols of the second zone, and wherein a transmission time interval (TTI) of the first zone is a subframe consisting of 14 or 12 OFDM symbols, and a TTI of the second zone is a subframe consisting of 3 GFDM symbols.

2. The method according to claim 1, wherein the number of sub-symbols of the GFDM symbols is determined based on a number of resource blocks or subcarriers of the second zone.

3. The method according to claim 1, wherein the number $M_{sub}$ of sub-symbols of the GFDM symbols of the second zone is an integer closest to $$\sqrt{\frac{N_{sc} \times N_{RS}}{N_{sym}}},$$

and corresponds to an aliquot of the number $N_{sc}$ of subcarriers of the second zone, where $N_{sym}$ is a number of GFDM symbols which belong to one TTI, and $N_{RS}$ is a number of GFDM symbols allocated as reference signals.

4. The method according to claim 1, wherein the predetermined number is less by one than the number of sub-symbols of the GFDM symbols of the second zone.

5. The method according to claim 1, wherein a user equipment (UE), which requires lower latency communication than a UE allocated to the first zone, is allocated to the second zone.

6. A base station (BS) for allocating resources for supporting a plurality of wireless communication modes in a wireless system, the BS comprising:

a processor configured to:

allocate a first zone consisting of orthogonal frequency division multiplexing (OFDM) symbols and a second zone consisting of generalized frequency division multiplexing (GFDM) symbols on time and frequency domains by a frequency division multiplexing scheme; and allocate a predetermined number of guard subcarriers to a boundary between the first zone and the second zone, wherein the predetermined number is determined based on a number of sub-symbols of the GFDM symbols of the second zone, and wherein a transmission time interval (TTI) of the first zone is a subframe consisting of 14 or 12 OFDM symbols, and a TTI of the second zone is a subframe consisting of 3 GFDM symbols.

7. The BS according to claim 6, wherein the number of sub-symbols of the GFDM symbols is determined based on a number of resource blocks or subcarriers of the second zone.

8. The BS according to claim 6, wherein the number $M_{sub}$ of sub-symbols of the GFDM symbols of the second zone is an integer closest to $$\sqrt{\frac{N_{sc} \times N_{RS}}{N_{sym}}},$$

and corresponds to an aliquot of the number $N_{sc}$ of subcarriers of the second zone, where $N_{sym}$ is a number of GFDM symbols which belong to one TTI, and $N_{RS}$ is a number of GFDM symbols allocated as reference signals.

9. The BS according to claim 6, wherein the predetermined number is less by one than the number of sub-symbols of the GFDM symbols of the second zone.

10. The BS according to claim 6, wherein the processor allocates a user equipment (UE), which requires lower latency communication than a UE allocated to the first zone, to the second zone.

* * * * *